Jan. 30, 1968     H. J. DURST     3,366,144

HIGH PRESSURE CONTROL DIAPHRAGM

Filed Oct. 18, 1965

INVENTOR
HENRY J. DURST
BY
ATTORNEY

United States Patent Office 3,366,144
Patented Jan. 30, 1968

3,366,144
HIGH PRESSURE CONTROL DIAPHRAGM
Henry J. Durst, St. Louis, Mo., assignor to Diatemp, Inc., St. Louis, Mo., a corporation of Missouri
Filed Oct. 18, 1965, Ser. No. 496,962
1 Claim. (Cl. 138—30)

ABSTRACT OF THE DISCLOSURE

A high pressure control diastat having a pair of diaphragm cups located inside a heavy-walled pressure vessel, one diaphragm cup having a hole at its center and said cup being welded around the periphery of said hole to the inside wall of said pressure vessel. Through that hole a force is maintained by a plunger, spring or liquid column on the other diaphragm cup. A high pressure fluid enters the heavy-walled pressure vessel by another hole and surrounds the pair of diaphragm cups, and thereby only the differential between the pressure of the high-pressure fluid and the force of the plunger is exerted on the diaphragm cups.

---

The principal object of my invention is to provide a diaphragm construction which will operate satisfactorily in the ranges of pressure from 1000 to 1500 pounds per square inch and higher. Such pressures are found in high pressurized refrigeration lines, steam lines and the like, and are far beyond the present useful ranges of the diaphragm art.

The diaphragm consists of the conventional pair of nested corrugated discs. These discs are stamped by dies to form the corrugations and are normally made of stainless steel, though they may be made of a variety of metal alloys. The conventional usages of such diaphragm pairs are well illustrated by United States Patents Numbers 2,307,636, issued to Newell in January of 1943, and 2,607,533, issued to Main in August of 1952. These show that diaphragm pairs, when seam-welded together at their periphery, that is circumferentially, are filled with any conventional organic filling fluid, of which a large variety are available. The fluid is generally chosen merely by the temperature range criterion, that is the expansion of the fluid must be linear over the range desired. The ranges are generally limited by the pressures developed in the diaphragm construction. That is a given number of degrees of temperature will create a pressure rise of so many pounds in the fluid contained within the pair of diaphragms.

The normal pressures to which current practices submit diastat constructions is of the order from 5 to 100 pounds. One of the reasons for this is that the wall thicknesses involved in diaphragms is quite small and rupture is easily accomplished.

In my construction, I place the diaphragms in a strong pressure vessel, so that the limiting factor in the pressures is the wall strength of the pressure vessel and not that of the diaphragms.

Also in the configuration which I employ, the diaphragms are empty and the fluid column does not terminate inside, or communicate with the inside of the diaphragms, but the fluid surrounds the outside surfaces of both diaphragms.

The long history of the development of the diastat has not heretofore showed the possibility of the use of the diastat in the high pressure field. My invention does not consist however of a mere reversal, in which the fluid column is placed outside the diaphragms rather than inside. I have found a unique construction of the diaphragms, which make a diastat much stronger and much more able to withstand the higher pressures involved in the new level of pressures, which represent more than a tenfold increase over the previous art.

Figure 1:
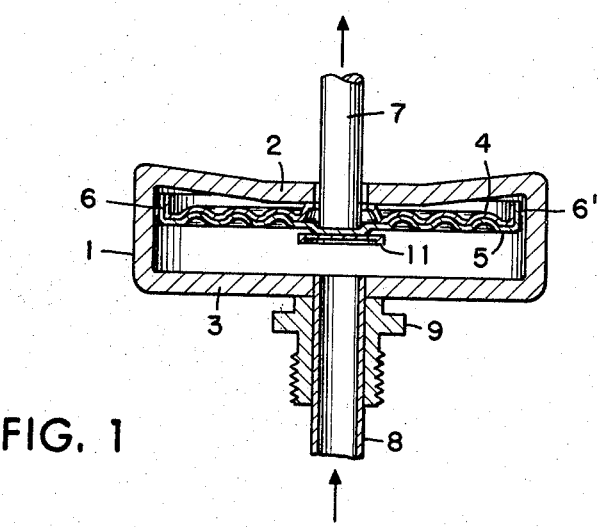
Figure 2:
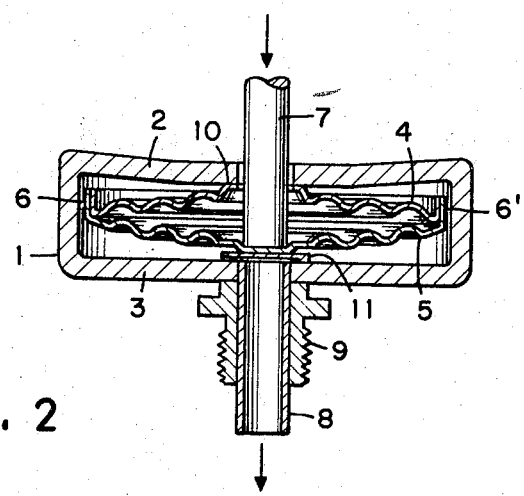

A particular configuration of my invention is illustrated in the attached drawing. This configuration is an example only and not to be construed as a limitation of the invention. The invention will be best understood from the following description of the illustrated embodiment, in which:

FIGURE 1 is a cross-sectional view, taken through a pressure vessel containing the diaphragms, with the pressure in the fluid column at its highest level, and FIGURE 2 is a similar cross-sectional view, of the same construction, with the pressure in the fluid column at its lowest level.

In FIGURE 1, I show a pressure vessel 1, provided with relatively thick metal outer walls, principal among them being an upper flattened wall and a lower flattened wall, numbered 2 and 3 respectively.

Inside the pressure vessel 1, I provide a pair of nested diaphragm cups 4 and 5, forming a pressure-sensitive transducer; the upper diaphragm cup 4 lies inside the lower diaphragm cup 5. The cups 4 and 5 are welded together along their outer peripheries, that is circumferentially as at 6, 6′.

I also provide a plunger 7 which represents a given force. This plunger passes through an opening in the upper wall and through an opening in the upper diaphragm cup 4 and rests upon the lower diaphragm cup 5. It will be obvious to those familiar with the art of diastats that the plunger 7 can be a spring exerting a force, or it may even be represented as a fluid column, as in the conventional diastat.

For solidity of construction, I prefer to spot weld the plunger 7 to the inside of the lower diaphragm cup. The purpose of the plunger force is to establish a switch or valve pressure point, as will be shown.

Opposite the opening for the plunger 7 in the upper flattened wall 2, I have provided an opening in the lower flattened wall 3. Through this opening I provide a fluid column connection in the form of a piece of conventional tubing together with a threaded fitting for mounting. The tubing is numbered 8 and the fitting is numbered 9.

In FIGURE 1, I show fluid at high pressure being admitted through the tubing 8. When the pressure becomes high enough to overcome the weight or force exerted by the plunger 7 on the lower diaphragm cup 5, the lower diaphragm is raised in the drawing. The entire diaphragm structure consisting of the upper cup 4 and the lower cup 5 has been collapsed together. The lower cup 5 is now pressing at several points, which actually are each a circular line extending around the two diaphragms, against the upper cup 4 which in turn has flattened against the upper flattened wall 2 of the pressure vessel 1.

In FIGURE 2, I show the opposite boundary condition. The fluid line pressure has dropped below the switching point. Thus the weight or force of the plunger 7 is greater than the presure in the fluid column in the tubing 8, and hence less than the pressure in the pressure vessel 1. In this condition the plunger 7 presses down on the lower diaphragm cup 5 and separates the lower diaphragm cup 5 from the upper diaphragm cup 4. The weld at 10 prevents the upper diaphragm cup from separating from the upper flattened wall 2 of the pressure vessel 1. The diaphragm however in this use is empty, and it is the pressure vessel 1 which is maintained filled with fluid through the tubing 8. The walls of the pressure vessel are hence the limiting factor in determining the pressure range over which the diaphragm operates. At 11 I show a stop plate which serves to prevent damage to the walls of the lower diaphragm cup 5 at the extreme end of its travel in FIGURE 2.

The illustrated embodiment has a wide application in high pressure refrigeration lines and in high pressure steam lines. It serves to extend the usefullness of the diastat construction to levels far beyond those which were considered practical previously. Also it will be obvious to those skilled in the art of diastat design that the views shown may be modified variously, and that many changes, modifications, and alterations may be made in the construction. For instance a spring may be used to exert the force required instead of the plunger 7, and I also contemplate using another fluid column in place of the plunger force, so that opposing fluid column pressures may be balanced for a null or switching point. I do not intend however that the invention be limited by any limitations other than those stated in the attached claim.

What I claim is:

1. In a high pressure control diaphragm of the class described,
    a pressure vessel formed of relatively thick metal outer walls, an upper flattened wall and a lower flattened wall being approximately parallel to each other;
    a pair of diaphragm cups, an upper cup and a lower cup, welded together at their outer peripheries and disposed in said pressure vessel between said upper and lower walls thereof;
    a plunger mounted relatively vertical to said cups and said walls, disposed through an opening in said upper wall and an opening in said upper diaphragm cup and mounted against said lower diaphragm cup;
    the upper diaphragm cup in said pressure vessel welded to the upper flattened wall of said pressure vessel, adjacent to the opening in said upper wall and the opening in said upper diaphragm cup, so that both cups move freely in expansion and contraction under pressure changes; a stop plate mounted on said lower diaphragm cup;
    and a fluid column connection in said lower flattened wall for connection to a high pressure source.

References Cited

UNITED STATES PATENTS

| | | | |
|---|---|---|---|
| 2,147,031 | 2/1939 | Hastings et al. | 138—26 |
| 2,198,021 | 4/1940 | Wood. | |
| 2,307,636 | 1/1943 | Newell | 236—15 |
| 2,607,533 | 8/1952 | Main | 236—99 |
| 3,038,553 | 6/1962 | Peters | 138—30 X |

FOREIGN PATENTS

| | | |
|---|---|---|
| 1,035,617 | 6/1966 | Great Britain. |
| 556,124 | 8/1932 | Germany. |

LAVERNE D. GEIGER, *Primary Examiner.*

N. C. CUDDEBACK, *Assistant Examiner.*